United States Patent
Toeda et al.

(10) Patent No.: US 12,028,718 B2
(45) Date of Patent: Jul. 2, 2024

(54) BASE STATION AND MEASUREMENT METHOD FOR OPTIMIZING LAYER 2 CONNECTIVITY

(71) Applicant: NTT DOCOMO, INC., Tokyo (JP)

(72) Inventors: Teruaki Toeda, Tokyo (JP); Tianyang Min, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 212 days.

(21) Appl. No.: 17/762,284

(22) PCT Filed: Oct. 1, 2019

(86) PCT No.: PCT/JP2019/038769
§ 371 (c)(1),
(2) Date: Mar. 21, 2022

(87) PCT Pub. No.: WO2021/064866
PCT Pub. Date: Apr. 8, 2021

(65) Prior Publication Data
US 2022/0369114 A1  Nov. 17, 2022

(51) Int. Cl.
*H04W 16/04* (2009.01)
*H04W 24/10* (2009.01)

(52) U.S. Cl.
CPC .......... *H04W 16/04* (2013.01); *H04W 24/10* (2013.01)

(58) Field of Classification Search
CPC .............................. H04W 16/04; H04W 24/10
See application file for complete search history.

(56) References Cited

U.S. PATENT DOCUMENTS

| | | | | |
|---|---|---|---|---|
| 10,834,615 | B2* | 11/2020 | Raghavan | H04B 7/0408 |
| 2013/0079009 | A1* | 3/2013 | Aumann | H04W 72/56 455/512 |
| 2015/0289263 | A1* | 10/2015 | Ohta | H04W 72/0446 370/329 |
| 2017/0223574 | A1 | 8/2017 | Watanabe et al. | |
| 2017/0324459 | A1* | 11/2017 | Koskela | H04B 7/0617 |
| 2019/0052378 | A1 | 2/2019 | Yiu et al. | |
| 2019/0223247 | A1* | 7/2019 | Kang | H04B 7/0408 |

FOREIGN PATENT DOCUMENTS

JP 2013-192056 A 9/2013
JP 2017-38118 A 2/2017
(Continued)

OTHER PUBLICATIONS

Extended European Search Report issued in counterpart European Patent Application No. 19948020.3, mailed on Apr. 13, 2023 (10 pages).

(Continued)

*Primary Examiner* — Chi H Pham
*Assistant Examiner* — Weibin Huang
(74) *Attorney, Agent, or Firm* — Osha Bergman Watanabe & Burton LLP

(57) ABSTRACT

A base station includes a communication unit configured to perform communication with a plurality of terminals through one or more cells, and a control unit configured to perform measurement of the number of active terminals in layer 2 measurement, wherein the control unit measures the number of the active terminals for each cell.

6 Claims, 5 Drawing Sheets

(56) References Cited

FOREIGN PATENT DOCUMENTS

KR         20160081780 A     7/2016
WO     WO-2012136245 A1 * 10/2012   ............ H04W 12/02

OTHER PUBLICATIONS

CATT; "Discussion on L2 measurements support in case of CU/DU split"; 3GPP TSG RAN WG3 Meeting #96, R3-171457; Hangzhou, China; May 15-19, 2017 (3 pages).
CMCC; "Beam Related L2 Measurements"; 3GPP TSG-RAN WG2 Meeting #105bis, R2-1904348; Xi'an, China; Apr. 8-12, 2019 (2 pages).
Office Action issued in Japanese Application No. 2021-550816, dated Jun. 27, 2023 (5 pages).
International Search Report issued in PCT/JP2019/038769 on Mar. 24, 2020 (5 pages).
Written Opinion of the International Searching Authority issued in PCT/JP2019/038769 on Mar. 24, 2020 (4 pages).
3GPP TS 36.314 V15.2.0; "3rd Generation Partnership Project; Technical Specification Group Radio Access Network; Evolved Universal Terrestrial Radio Access (E-UTRA); Layer 2—Measurements (Release 15)"; Dec. 2018 (6 pages).
3GPP TS 38.300 V15.6.0; "3rd Generation Partnership Project; Technical Specification Group Radio Access Network; NR; NR and NG-RAN Overall Description; Stage 2 (Release 15)"; Jun. 2019 (99 pages).
Office Action issued in counterpart Japanese Patent Application No. 2021-550816 mailed on Sep. 12, 2023 (5 pages).

* cited by examiner

BASE STATION AND MEASUREMENT METHOD FOR OPTIMIZING LAYER 2 CONNECTIVITY

TECHNICAL FIELD

The present invention relates to a base station and a measurement method in a radio communication system.

BACKGROUND ART

In New Radio (NR) that is a successor system of Long Term Evolution (LTE) (which is also called 5G), a technology that satisfies requirements of a large capacity system, high data transmission speed, low delay, concurrent connections of many terminals, low cost, power saving, and the like, has been discussed (e.g., Non-Patent Document 1).

In the NR, support for a self-organizing network (SON) function has been discussed. The SON function includes, for example, mobility robustness optimization (MRO) in an intra-system and an inter-system, mobility load balancing (MLB) in the intra-system, RACH optimization. To enhance such an operation of a network, technical specifications of a report transmitted from a terminal to the network, have been discussed.

PRIOR ART DOCUMENT

Non-patent Documents

Non-Patent Document 1: 3GPP TS 38.300 V15.6.0 (2019-06)

SUMMARY OF THE INVENTION

Problem to be Solved by the Invention

In order to determine the extent of congestion on the network, measurement of the number of active user equipment (UE) is introduced in layer 2 measurement. However, a target range in the measurement of the number of active UE has not been clarified.

The present invention has been made in view of the above-described point, and it is an object to clarify a target range in the measurement of the number of active terminals in the radio communication system.

Means for Solving Problem

According to a disclosed technique, a base station including a communication unit configured to perform communication with a plurality of terminals through one or more cells, and a control unit configured to perform measurement of the number of active terminals in layer 2 measurement, wherein the control unit measures the number of the active terminals for each cell, is provided.

Effect of the Invention

According to a disclosed technique, in the radio communication system, a target range in the measurement of the number of active terminals can be clarified.

MODE(S) FOR CARRYING OUT THE INVENTION

An embodiment of the present invention will be described below with reference to the drawings. The embodiment described below is an example, and an embodiment to which the present invention can be applied is not limited to the embodiment below.

In an operation of a radio communication system according to the embodiment of the present invention, an existing technique can be used appropriately. The existing technique is an existing LTE, for example. However, the existing technique is not limited to the existing LTE. The term "LTE" used in the present specification indicates a broad meaning including LTE-Advanced and a system after LTE-Advanced (e.g., NR), unless otherwise indicated.

In the embodiment of the present invention described below, terms such as a synchronization signal (SS), a primary SS (PSS), a secondary SS (SSS), a physical broadcast channel (PBCH), a physical random access channel (PRACH), a physical downlink control channel (PDCCH), a physical downlink shared channel (PDSCH), a physical uplink control channel (PUCCH), and a physical uplink shared channel (PUSCH), which are used in the existing LTE, are used. These terms are used for convenience of explanation, and similar signals, functions, and so on may be differently termed. In NR, the terms described above correspond to an NR-SS, an NR-PSS, an NR-SSS, an NR-PBCH, an NR-PRACH, and so on. However, "NR-" is not necessarily specified even if a signal is used for NR.

In the embodiment of the present invention, the duplexing method may be time division duplexing (TDD) method, may be frequency division duplexing (FDD) method, or may be another method (e.g., flexible division duplexing).

In the embodiment of the present invention, a description that a radio parameter or the like is configured may indicate that a predetermined value is pre-configured, or may indicate that a radio parameter sent from a base station 10 or a terminal 20 is configured.

Figure 1:
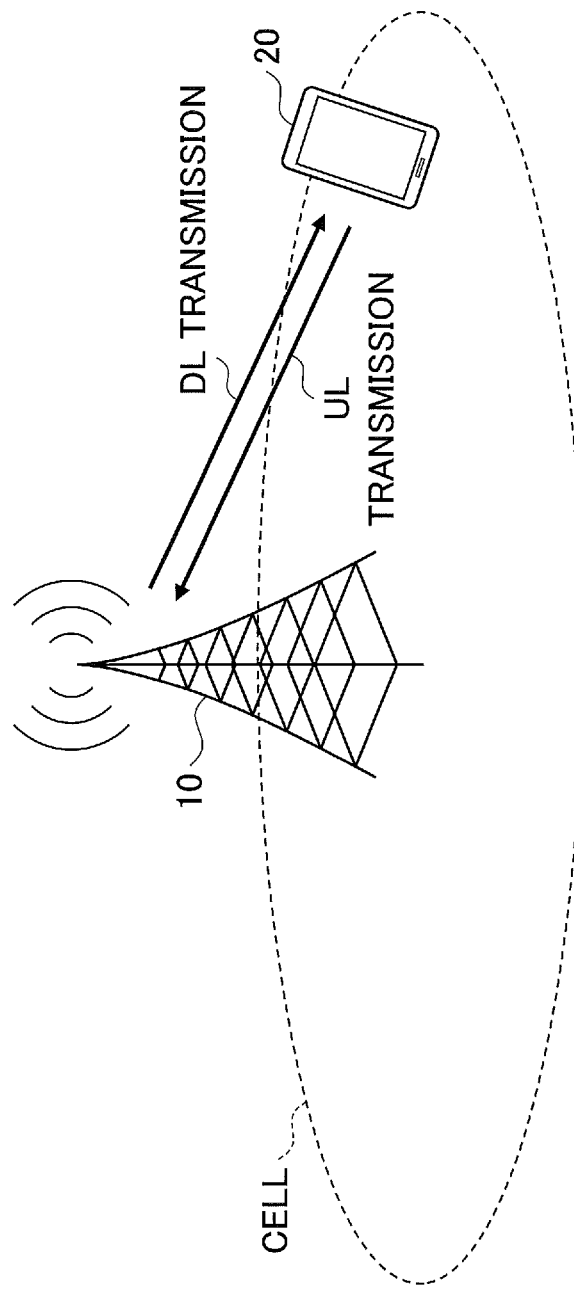
FIG. 1 is a drawing illustrating a configuration example of a radio communication system according to an embodiment of the present invention.

FIG. 1 is a drawing illustrating a configuration example of a radio communication system according to the embodiment of the present invention. As illustrated in FIG. 1, the radio communication system according to the embodiment of the present invention includes the base station 10 and the terminal 20. In FIG. 1, one base station 10 and one terminal 20 are illustrated, but this is an example, and multiple base stations 10 and multiple terminals 20 may exist.

The base station 10 provides one or more cells, and is a communication device that performs radio communication with the terminal 20. A physical resource of a radio signal is defined in a time domain and a frequency domain. The time domain may be defined by the number of orthogonal frequency division multiplexing (OFDM) symbols and the frequency domain may be defined by the number of subcarriers or the number of resource blocks. The base station 10 transmits a synchronization signal and system information to the terminal 20. The synchronization signal is, for example, an NR-PSS and an NR-SSS. The system information is transmitted by an NR-PBCH, for example, and is also referred to as broadcast information. As illustrated in FIG. 1, the base station 10 transmits a control signal or data by DL (downlink) to the terminal 20, and receives a control signal or data by UL (uplink) from the terminal 20. Both the base station 10 and the terminal 20 can perform beamforming to transmit and receive a signal. Both the base station 10 and the terminal 20 can apply multiple input multiple output (MIMO) communication to DL or UL. Both the base station 10 and the terminal 20 may communicate through a secondary cell (SCell) and a primary cell (PCell) by carrier aggregation (CA). Further, the terminal 20 may communicate through a primary cell of the base station 10 by a dual connectivity (DC) and through a primary secondary cell (PSCell) of another base station 10.

The terminal 20 is a communication device having a wireless communication function, such as a smartphone, a mobile phone, a tablet, a wearable terminal, and a communication module for Machine-to-Machine (M2M). As illustrated in FIG. 1, the terminal 20 receives a control signal or data by DL from the base station 10, and transmits a control signal or data by UL to the base station 10 to use various communication services provided by the wireless communication system.

In the NR, support for a self-organizing network (SON) function has been considered. The SON function includes, for example, mobility robustness optimization (MRO) in an intra-system and inter-system, mobility load balancing (MLB) in the intra-system, RACH optimization. To enhance such an operation of a network, a specification of a report transmitted from a terminal to the network, has been considered. Additionally, a specification of an information exchange between internodes in the network has been considered.

Further, support for a minimization of drive test (MDT) function according to a use case is has been considered. The MDT function includes, for example, coverage optimization, Quality of Service (QoS) verification with MDT, MDT improvement in an indoor environment, location information reporting, and sensor data collection. A specification of logging related to the MDT in the terminal 20 in a radio resource control (RRC) idle state and an RRC inactive state has been considered. A specification of an immediate MDT in the terminal 20 in an RRC connected state has been considered. A specification of reporting related to measurement of radio link failure (RLF) and access availability has been considered.

Additionally, a specification of the MDT which assumes stand-alone, NR-DC, and EN-DC (EUTRA-NR DC) scenarios in a central unit (CU) and a distributed unit (DU) split architecture has been considered. A specification of relevant layer 2 measurement has been considered. A specification of mobility history information stored in the terminal 20 in an RRC idle state, an RRC inactive state, and an RRC connected state, using the mobility history information of the LTE as a baseline, has been considered.

Figure 2:
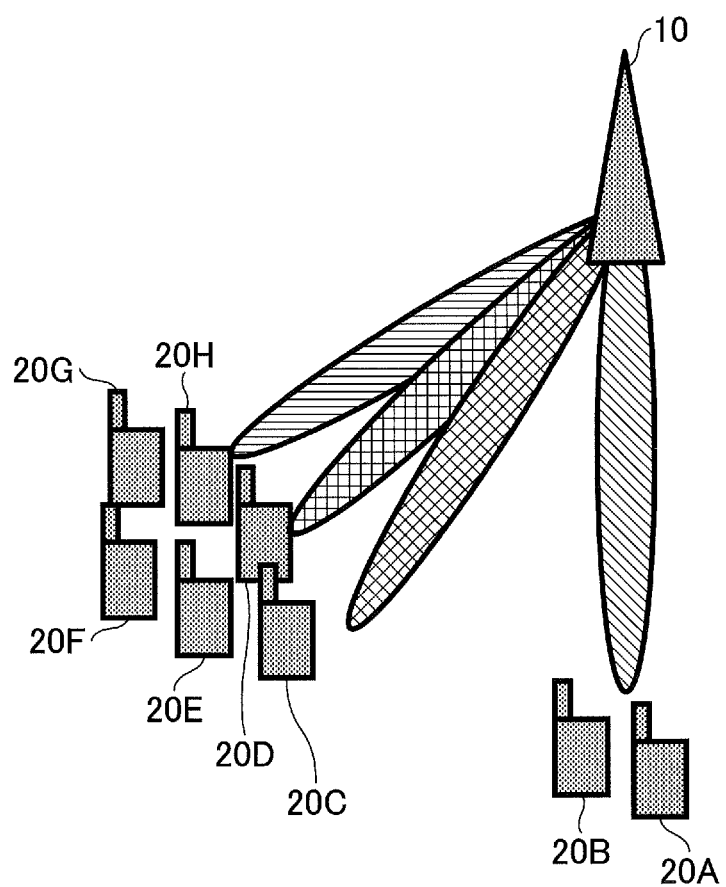
FIG. 2 is a drawing for describing an operation of the radio communication system according to the embodiment of the present invention.

FIG. 2 is a drawing for describing an operation of the radio communication system according to the embodiment of the present invention. In order to determine a congestion condition of a cell or a base station, measurement of the number of active UE is introduced in the layer 2 measurement of the LTE as the measurement related to the SON or MDT. In the measurement of the number of active UE in the LTE, it is not clear whether the measurement is performed for each base station 10 or for each cell.

Thus, the measurement of the number of active UE is clearly defined to be performed for each cell. Furthermore, in the NR, the number of active UE per beam may be measured. As illustrated in FIG. 2, when the base station 10 applies a transmission beam, for example, when terminals 20A to 20H transmit a PRACH associated with an SS/PBCH Block (SSB) or a channel state information-reference signal (CSI-RS), the terminals 20A to 20H may be defined as the active UE of the beam applied to the SSB or the CSI-RS. For example, in UL, the active UE of the beam may be determined using buffer status reports sent from the terminals 20A to 20H. When the base station 10 transmits a UL grant specifying a resource corresponding to the buffer status report, to the terminal 20, the base station 10 specifies a beam. The active UE corresponding to the beam may be counted to be present. For example, in DL, when data exists in a buffer of either PDCP, RLC, or MAC, a scheduler of the base station 10 determines which beam is applied for transmission to the terminal 20, and thus the active UE corresponding to the determined beam may be counted to be present.

By measuring the number of active UE for each beam, a load state for each beam can be determined. Thus, by assigning relatively unoccupied beam resources to a beam in which the congestion is expected, the congestion condition can be eased.

Figure 3:
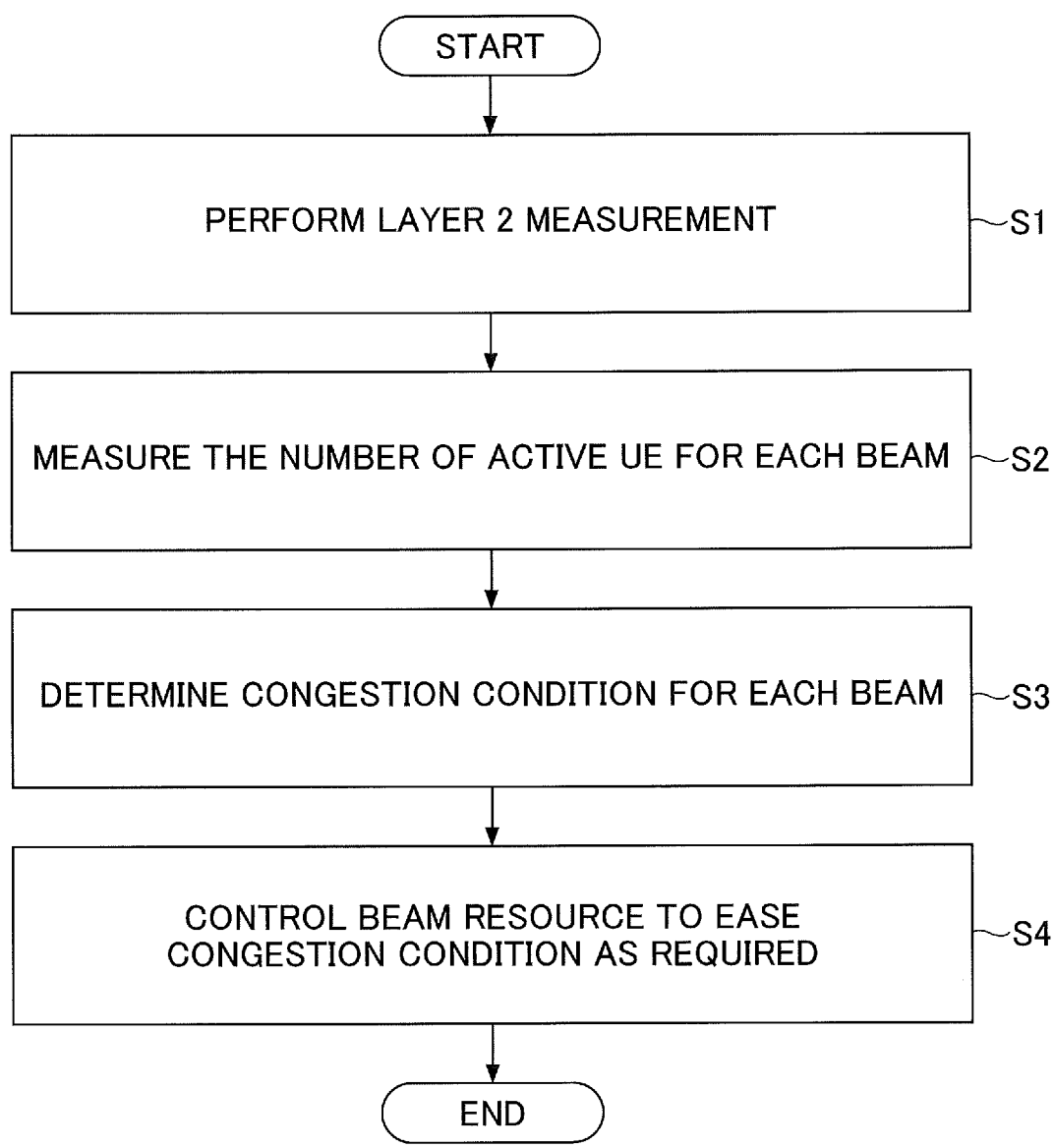
FIG. 3 is a flowchart for describing an example of the radio communication system according to the embodiment of the present invention.

FIG. 3 is a flowchart for describing an example of the radio communication system according to the embodiment of the present invention. In step S1, the layer 2 measurement is performed in the radio communication system. For example, a target of the layer 2 measurement may be measurement of the number of active UE, a PRB usage rate, received random access preambles, packet delay, data loss, throughput, data volume, and the like.

In step S2, the number of active UE for each beam of a cell is measured. In step S2, the number of active UE for each cell may be measured, or the number of active UE for each base station 10 may be measured.

Eq. 1 is a mathematical equation indicating a conventional definition for measuring the number of the active UE.

$$M(T, qci, p) = \left\lceil \frac{\sum_{Hi} N(i, qci)}{I(T, p)} \right\rceil \quad [\text{Eq. 1}]$$

M(T, qci, p) in Eq. 1 represents the number of the active UE for each QoS Class Identifier (QCI) in a measurement duration T and a sampling duration p. For M(T, qci, p), only the DL may be measured, only the UL may be measured, and the DL and the UL may be measured. I(T, p) represents the number of sampling times in the measurement duration T. N(i, qci) is the number of UE in which data buffered in a MAC, RLC, or PDCP protocol layer is present, i is a sampling opportunity, and qci is a traffic class of a data radio bearer. When only the DL is measured, the number of UE in which data buffered in the MAC, RLC, or PDCP protocol layer of the DL is present, is measured. When only the UL is measured, the number of UE in which data buffered in the MAC, RLC, or PDCP protocol layer of the UL is present, is measured. When the DL and the UL are measured, the number of UE in which data buffered in the MAC, RLC or PDCP protocol layers of the DL and the UL is present, is measured.

Eq. 2 is a mathematical equation indicating a definition for measuring the number of active UE in the embodiment of the present invention.

$$M(T, qci, \text{cell\_index}, p) = \left\lfloor \frac{\sum_{\forall i} N(i, qci, \text{cell\_index})}{I(T, p)} \right\rfloor \quad [\text{Eq. 2}]$$

As shown in Eq. 2, a parameter "cell_index" is added. By adding cell_index, it becomes possible to define the number of active UEs measured for each cell.

Eq. 3 is a mathematical equation indicating a definition for measuring the number of active UE in the embodiment of the present invention.

$$M(T, qci, \text{beam\_index}, p) = \left\lfloor \frac{\sum_{\forall i} N(i, qci, \text{beam\_index})}{I(T, p)} \right\rfloor \quad [\text{Eq. 3}]$$

As shown in Eq. 3, a parameter "beam index" is added. Adding beam_index can define that the number of active UE is measured for each beam. Beam_index corresponds to either SSB_index or CSIRS_index.

Eq. 4 is a mathematical equation indicating a definition for measuring the number of active UE in the embodiment of the present invention.

$$M(T, qci, \text{SSB\_index}, p) = \left\lfloor \frac{\sum_{\forall i} N(i, qci, \text{SSB\_index})}{I(T, p)} \right\rfloor \quad [\text{Eq. 4}]$$

As shown in Eq. 4, a parameter "SSB_index" is added. Adding SSB_index can define that the number of active UE is measured for each SSB.

Eq. 5 is a mathematical equation indicating a definition for measuring the number of active UE in the embodiment of the present invention.

$$M(T, qci, \text{CSIRS\_index}, p) = \left\lfloor \frac{\sum_{\forall i} N(i, qci, \text{CSIRS\_index})}{I(T, p)} \right\rfloor \quad [\text{Eq. 5}]$$

As shown in EQ. 5, a parameter "CSIRS_index" is added. Adding CSIRS_index can define that the number of active UE is measured for each CSIRS.

Eq. 6 is a mathematical equation indicating a conventional definition for measuring the number of active UE.

$$M(T, p) = \left\lfloor \frac{\sum_{\forall i} N(i)}{I(T, p)} \right\rfloor \quad [\text{Eq. 6}]$$

M(T, p) shown in Eq. 6 indicates the number of active UE in the measurement duration T and the sampling duration p. For M(T, p), only the DL may be measured, only the UL may be measured, and the DL and the UL may be measured. I(T, p) indicates the number of sampling times in the measurement duration T. N(i) is the number of UE in which data buffered in the MAC, RLC, or PDCP protocol layer is present, and i is the sampling opportunity. When the DL and the UL are measured, the number of UE in which data buffered in the MAC, RLC or PDCP protocol layers of the DL and the UL is present, is measured.

Eq. 7 is a mathematical equation indicating a definition for measuring the number of active UE in the embodiment of the present invention.

$$M(T, \text{cell\_index}, p) = \left\lfloor \frac{\sum_{\forall i} N(i, \text{cell\_index})}{I(T, p)} \right\rfloor \quad [\text{Eq. 7}]$$

As shown in Eq. 7, the parameter "cell_index" is added. Adding cell_index can define that the number of active UE is measured for each cell.

Eq. 8 is a mathematical equation indicating a definition for measuring the number of active UE in the embodiment of the present invention.

$$M(T, \text{beam\_index}, p) = \left\lfloor \frac{\sum_{\forall i} N(i, \text{beam\_index})}{I(T, p)} \right\rfloor \quad [\text{Eq. 8}]$$

As shown in Eq. 8, the parameter "beam_index" is added. Adding the beam_index can define that the number of active UE is measured for each beam. beam index corresponds to either SSB_index or CSIRS_index.

Eq. 9 is a mathematical equation indicating a definition for measuring the number of active UE in the embodiment of the present invention.

$$M(T, \text{SSB\_index}, p) = \left\lfloor \frac{\sum_{\forall i} N(i, \text{SSB\_index})}{I(T, p)} \right\rfloor \quad [\text{Eq. 9}]$$

As shown in Eq. 9, the parameter "SSB_index" is added. Adding SSB_index can define that the number of active UE is measured for each SSB.

Eq. 10 is a mathematical equation indicating a definition for measuring the number of active UE in the embodiment of the present invention.

$$M(T, \text{CSIRS\_index}, p) = \left\lfloor \frac{\sum_{\forall i} N(i, \text{CSIRS\_index})}{I(T, p)} \right\rfloor \quad [\text{Eq. 10}]$$

As shown in Eq. 10, the parameter "CSIRS_index" is added. Adding CSIRS_index can define that the number of active UE is measured for each CSIRS.

In step S3, the network determines the congestion condition for each beam of a cell. Subsequently, the network controls the beam resource to ease the congestion condition as required (S4).

Here, in Eq. 3, Eq. 4, Eq. 5, Eq. 7, Eq. 8, and Eq. 9, since beam_index, SSB_index, and CSIRS_index are parameters defined for each cell, cell_index and the beam_index, SSB_index, or CSIRS_index may be represented as a two-dimensional matrix and the measured number of active UE may correspond to each element of the matrix.

In Eq. 3, Eq. 4, Eq. 5, Eq. 7, Eq. 8, and Eq. 9, in order to indicate that beam_index, SSB_index, and CSIRS_index are parameters defined for each cell, they may be represented with a subscript c indicating that they are under a cell, such as $\text{beam\_index}_c$, $\text{SSB\_index}_c$, and $\text{CSIRS\_index}_c$.

According to the embodiment described above, the base station 10 can perform the measurement of the number of active terminals for each cell, each beam, each SSB, or each CSIRS.

That is, in the radio communication system, the target range in the measurement of the number of active terminals can be clarified.

(Device Configuration)

Next, an example of the functional configurations of the base station 10 and the terminal 20 performing the processes and operations described above, will be described. The base station 10 and the terminal 20 include functions for performing the embodiments described above. However, each of the base station 10 and the terminal 20 may include only a part of functions in the embodiments.

<Base Station 10>

Figure 4:
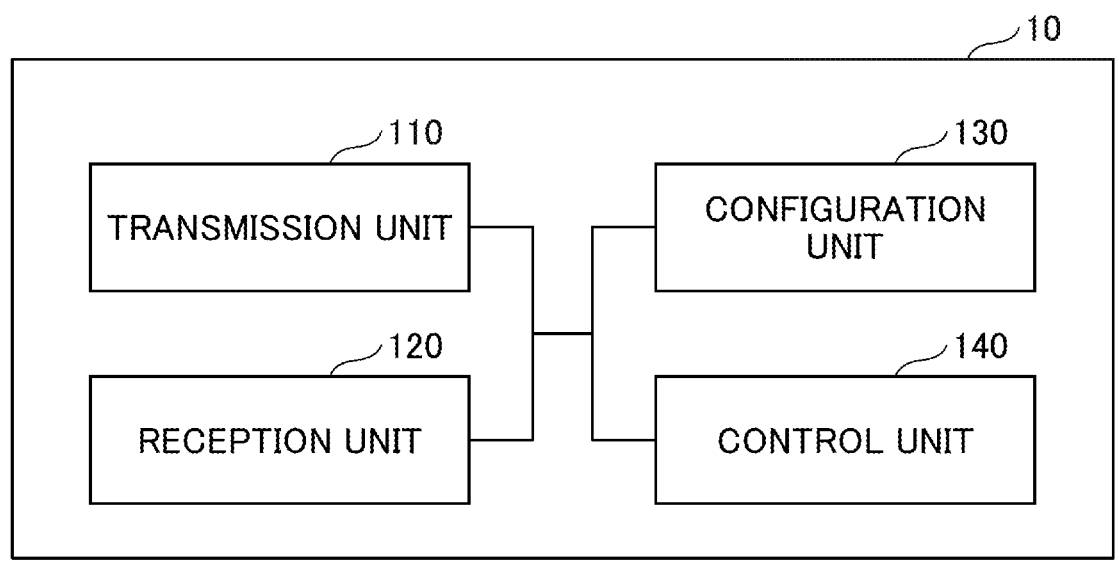
FIG. 4 is a drawing illustrating an example of a functional configuration of a base station 10 according to the embodiment of the present invention.

FIG. 4 is a drawing illustrating an example of a functional configuration of the base station 10 according to the embodiment of the present invention. As illustrated in FIG. 4, the base station 10 includes a transmission unit 110, a reception unit 120, a configuration unit 130, and a control unit 140. The functional configuration illustrated in FIG. 4 is merely an example. The functional division and names of the functional units are not limited as long as the operations according to the embodiment of the present invention can be performed.

The transmission unit 110 includes a function to generate a signal to be transmitted to the terminal 20, and a function to transmit the signal wirelessly. The transmission unit 110 transmits a message between network nodes to another network node. The reception unit 120 includes a function to receive various types of signals transmitted from the terminal 20, and a function to obtain information about upper layers from the received signal, for example. The transmission unit 110 includes a function of transmitting an NR-PSS, an NR-SSS, an NR-PBCH, a DL/UL control signal, a DL/UL data signal, and the like to the terminal 20. The reception unit 120 receives a message between network nodes from another network node.

The configuration unit 130 stores pre-configured configuration information, and various configuration information to be transmitted to the terminal 20. Contents of the configuration information include a configuration related to the layer 2 measurement of the terminal 20, a configuration of the beam, and information related to a configuration of the SSB or the CSIRS, for example.

The control unit 140 performs control of the layer 2 measurement and the measurement of the number of active UE as described in the embodiment. Additionally, the control unit 140 controls communication to which the beam is applied. Functional units concerning signal transmission in the control unit 140 may be incorporated in the transmission unit 110, and functional units concerning signal reception in the control unit 140 may be incorporated in the reception unit 120.

<Terminal 20>

Figure 5:
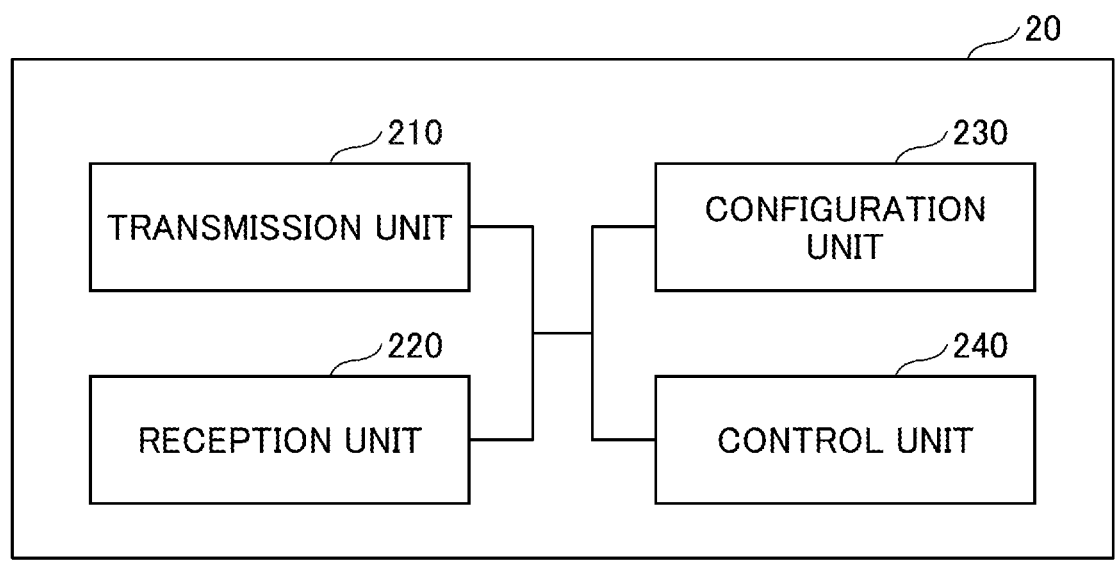
FIG. 5 is a drawing illustrating an example of a functional configuration of a terminal 20 according to the embodiment of the present invention.

FIG. 5 is a drawing illustrating an example of a functional configuration of the terminal 20 according to the embodiment of the present invention. As illustrated in FIG. 5, the terminal 20 includes a transmission unit 210, a reception unit 220, a configuration unit 230, and a control unit 240. The functional configuration illustrated in FIG. 5 is merely an example. The functional division and names of the functional units are not limited as long as the operations according to the embodiment of the present invention can be performed.

The transmission unit 210 generates a transmission signal from data to be transmitted, and transmits the transmission signal wirelessly. The reception unit 220 receives various types of signals wirelessly, and obtains a signal of an upper layer from a physical layer of the received signal. The reception unit 220 includes a function to receive an NR-PSS, an NR-SSS, an NR-PBCH, a DL/UL/SL control signal, and the like transmitted from the base station 10. For example, the transmission unit 210 transmits a physical sidelink control channel (PSCCH), a physical sidelink control channel (PSSCH), a physical sidelink discovery channel (PSDCH), a physical sidelink broadcast channel (PSBCH) or the like to another terminal 20, as D2D communication, and the reception unit 220 receives a PSCCH, a PSSCH, a PSDCH, a PSBCH, or the like from another terminal 20.

The configuration unit 230 stores various configuration information received by the reception unit 220 from the base station 10. The configuration unit 230 also stores pre-configured configuration information. Contents of the configuration information include a beam configuration and information related to a configuration of the SSB or the CSIRS, for example.

The control unit 240 performs control of the communication to which the beam is applied as described in the embodiment. Functional units concerning signal transmission in the control unit 240 may be incorporated in the transmission unit 210, and functional units concerning signal reception in the control unit 240 may be incorporated in the reception unit 220.

<Hardware Configuration>

The block diagrams used to describe the embodiment above (which are FIG. 4 and FIG. 6) illustrate blocks of functional units. The functional blocks (components) are implemented by any combination of hardware, software, or both. A means for implementing each functional block is not particularly limited. That is, each functional block may be implemented by one device in which components are physically or logically coupled, or by multiple devices that are two or more devices physically or logically separated from each other and connected directly or indirectly (with a wire connection or a wireless connection, for example). A functional block may be implemented by a combination of one device described above or multiple devices described above, and software.

A function includes determining, deciding, judging, calculating, computing, processing, deriving, investigating, looking up, ascertaining, receiving, transmitting, outputting, accessing, resolving, selecting, choosing, establishing, comparing, assuming, expecting, regarding, broadcasting, notifying, communicating, forwarding, configuring, reconfiguring, allocating, mapping, and assigning, but is not limited to these. A functional block (component) that functions transmission is called a transmitting unit or a transmission unit, for example. As described above, a means for implementing a transmitting unit and a transmission unit is not limited.

Figure 6:
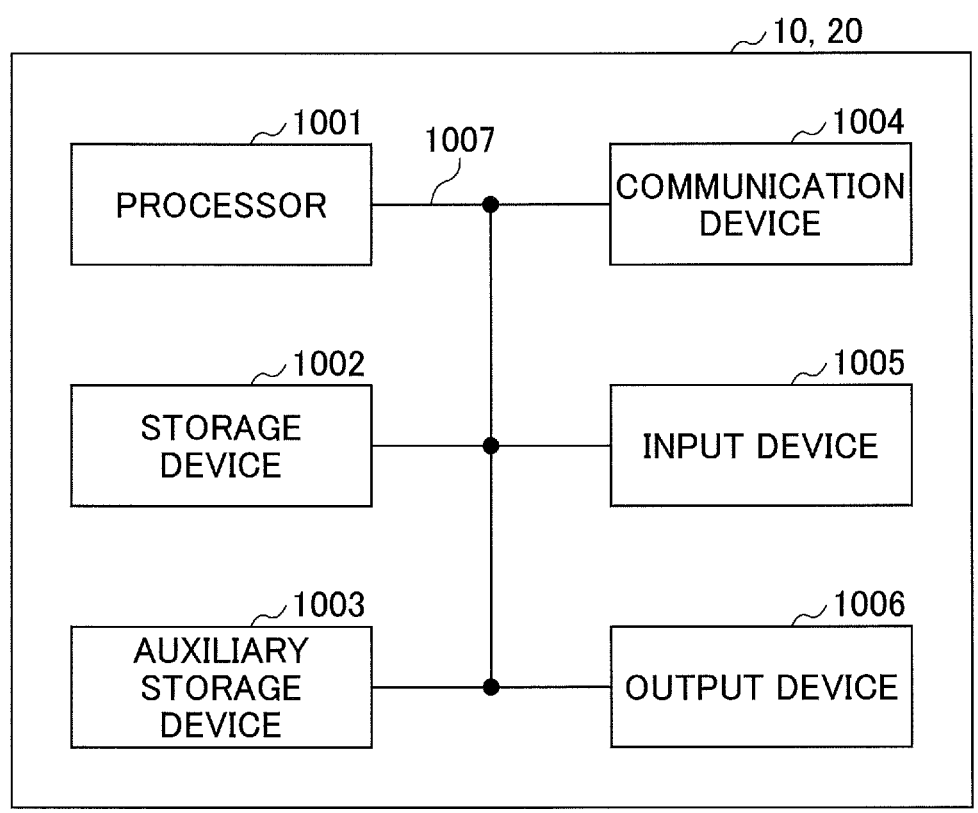
FIG. 6 is a drawing illustrating an example of a hardware configuration of the base station 10 or the terminal 20 according to the embodiment of the present invention.

The base station 10, the terminal 20, or the like according to an embodiment of the present disclosure may function as a computer that performs a process of a radio communication method of the present disclosure, for example. FIG. 6 is a diagram illustrating an example of a hardware configuration of the base station 10 and the terminal 20 according to an embodiment of the present disclosure. The base station 10 and the terminal 20 described above may be configured as a computer device that physically includes a processor 1001, a storage device 1002, an auxiliary storage device 1003, a communication device 1004, an input device 1005, an output device 1006, and a bus 1007.

In the following description, a word "device" can be referred to as a circuit, an apparatus, a unit, or the like. The hardware configurations of the base station 10 and the terminal 20 may include one or more devices illustrated in the drawing or may not include some devices.

Each function of the base station 10 and the terminal 20 is implemented by the following process: predetermined software (program) is loaded into hardware such as the processor 1001 and the storage device 1002, and the processor 1001 performs an operation to control communication of the communication device 1004 and at least one of reading and writing of data in the storage device 1002 and the auxiliary storage device 1003.

The processor 1001 operates, for example, an operating system to control an overall operation of the computer. The processor 1001 may be a central processing unit (CPU) including, for example, an interface with peripheral devices, a control device, an arithmetic device, and a register. For example, the control unit 140, the control unit 240, and so on described above may be implemented by the processor 1001.

The processor 1001 loads a program (program code), a software module, data, or the like from at least one of the auxiliary storage device 1003 and the communication device 1004 into the storage device 1002 and performs various types of processes according to the program, the software module, the data, or the like. A program that causes a computer to perform at least some of the operations described in the embodiment above may be used. For example, the control unit 140 of the base station 10 illustrated in FIG. 4 may be implemented by a control program that is stored in the storage device 1002 and that is executed by the processor 1001. For example, the control unit 240 of the terminal 20 illustrated in FIG. 5 may be implemented by a control program that is stored in the storage device 1002 and that is executed by the processor 1001. It is described that the various processes described above are performed by one processor 1001; however, the processes may be simultaneously or sequentially performed by two or more processors 1001. The processor 1001 may be implemented by one or more chips. The program may be transmitted over a network through a telecommunication line.

The storage device 1002 is a computer-readable recording medium, and may include, for example, at least one of a read only memory (ROM), an erasable programmable ROM (EPROM), an electrically erasable programmable ROM (EEPROM), and a random access memory (RAM). The storage device 1002 may be also referred to as, for example, a register, a cache, or a main memory (a main storage device). The storage device 1002 can store, for example, an executable program (program code) and a software module so as to perform a communication method according to the embodiment of the disclosure.

The auxiliary storage device 1003 is a computer-readable recording medium, and may include, for example, at least one of an optical disk such as a CD-ROM (Compact Disc ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage medium described above may be, for example, a database, a server, and other suitable media including at least one of the storage device 1002 and the auxiliary storage device 1003.

The communication device 1004 is hardware (a transmission and reception device) for communicating with a computer through at least one of a wired network and a wireless network, and is also referred to as, for example, a network device, a network controller, a network card, or a communication module. In order to achieve at least one of a frequency division duplex (FDD) and a time division duplex (TDD), for example, the communication device 1004 may include a high-frequency switch, a duplexer, a filter, and a frequency synthesizer. For example, a transmission and receiving antenna, an amplifier unit, a transmission and receiving unit, a transmission channel interface and the like may be implemented by the communication device 1004. A transmission and receiving unit may be implemented by being physically or logically separated into a transmission unit and a reception unit.

The input device 1005 is an input unit that receives an input from the outside (for example, a keyboard, a mouse, a microphone, a switch, a button, or a sensor). The output device 1006 is an output unit that performs an output process to the outside (for example, a display, a speaker, or an LED lamp). The input device 1005 and the output device 1006 may be integrated into a single device (for example, a touch panel).

Devices such as the processor 1001 and the storage device 1002 are connected to each other through the bus 1007 for communicating information. The bus 1007 may be a single bus or the devices may be connected to each other by different buses.

The base station 10 and the terminal 20 may include hardware such as a microprocessor, a digital signal processor (DSP), an application specific integrated circuit (ASIC), a programmable logic device (PLD), and a field programmable gate array (FPGA), and some or all of the functional blocks may be implemented by the hardware. For example, the processor 1001 may be implemented by at least one of these hardware components.

Summary of the Embodiment

As described above, according to the embodiment of the present invention, a base station including a communication unit that performs communication with multiple terminals through one or more cells and a control unit that performs measurement of the number of active terminals in layer 2 measurement, wherein the control unit measures the number of active terminals for each cell, is provided.

With the above-described configuration, the base station 10 can perform the measurement of the number of active terminals for each cell, each beam, each SSB, or each CSIRS. That is, in the radio communication system, the target range in the measurement of the number of active terminals can be clarified.

The control unit may measure the number of active terminals for each cell and each beam. With such a configuration, the base station 10 can perform the measurement of the number of active terminals for each beam.

The control unit may measure the number of active terminals for each cell and for each SS/PBCH Block (SSB) index. With such a configuration, the base station 10 can perform the measurement of the number of active terminals for each SSB.

The control unit may measure the number of active terminals for each cell and each channel state information reference signal (CSIRS) index. With such a configuration, the base station 10 can perform the measurement of the number of active terminals for each CSIRS.

The control unit may perform control of the resource of the beam based on the number of active terminals. With such a configuration, the base station 10 can perform the control of the resource of the beam in accordance with the congestion condition.

According to the embodiment of the present invention, a measurement method performed by a base station, including performing communication with multiple terminals through one or more cells and performing measurement of the number of active terminals in layer 2 measurement, wherein the performing includes measuring the number of active terminals for each cell, is provided.

With the above-described configuration, the base station 10 can perform the measurement of the number of active terminals for each cell, each beam, each SSB, or each CSIRS. That is, in the radio communication system, the target range in the measurement of the number of active terminals can be clarified.

Supplementary Explanation of the Embodiment

The embodiment of the present invention has been described above. However, the disclosed invention is not limited to the embodiment and it will be understood by those skilled in the art that various variations, modifications, alterations, substitutions, and so on can be made. Specific numerical examples are used for the description to facilitate the understanding of the invention. However, the numerical values are merely examples and any appropriate values may be used, unless otherwise stated. The classification of the sections in the description above is not essential in the invention and matters described in two or more sections may be combined and used, if necessary. Matters described in one section may be applied to matters described in another section (unless a contradiction arises). The boundaries between the functional units or the processing units in the functional block diagram do not necessarily correspond to the boundaries between physical components. The operation of a plurality of functional units may be physically performed by one component. Alternatively, the operation of one functional unit may be physically performed by a plurality of components. In the procedures described in the embodiment, the order of the processes may be changed unless a contradiction arises. For convenience of explanation of the processes, the base station 10 and the terminal 20 have been described with reference to the functional block diagrams. However, the devices may be implemented by hardware, software, or a combination thereof. Each of the software that is operated by the processor included in the base station 10 according to the embodiment of the present invention and the software that is operated by the processor included in the terminal 20 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, and other suitable storage media.

The transmission of information is not limited to the aspects/embodiments described in the disclosure and may be performed by other means. For example, the transmission of information may be performed by physical layer signaling (for example, downlink control information (DCI) and uplink control information (UCI)), upper layer signaling (for example, radio resource control (RRC) signaling, medium access control (MAC) signaling, or broadcast information (a master information block (MIB) and a system information block (SIB)), another signal, or a combination thereof. The RRC signaling may be also referred to as an RRC message and may be, for example, an RRC connection setup message or an RRC connection reconfiguration message.

Each aspect/embodiment described in the disclosure may be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), new Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system using other suitable systems, and a next-generation system that has functionality enhanced based on these systems. In addition, each aspect/embodiment described in the disclosure may be applied to combined systems (for example, a combination of at least one of LTE and LTE-A, and 5G).

In a processing order, sequence, flow chart, and so on of each aspect/embodiment described in the specification, the order may be changed unless a contradiction arises. For example, a means described in the disclosure indicates elements of various steps by using an exemplary order, and is not limited to a specific order that is indicated.

In the specification, a specific operation performed by the base station 10 may be performed by an upper node of the base station. In a network having one or a plurality of network nodes including the base station 10, it is clearly understood that various operations performed for communication with the terminal 20 can be performed by at least one of the base station 10 and a network node other than the base station 10 (for example, an MME or an S-GW are included, but not limited to these). In the description above, one network node other than the base station 10 is described as an example, but other network node may be a combination of a plurality of other network nodes (for example, an MME and an S-GW)

Information, a signal or the like described in the disclosure can be output from an upper layer (or a lower layer) to a lower layer (or an upper layer), and may be input or output through a plurality of network nodes.

The input or output information or the like may be stored in a specific location (for example, a memory) or may be managed in a management table. The input or output information or the like may be overwritten, updated, or edited. The output information or the like may be deleted. The input information or the like may be transmitted to another device.

Determination in the disclosure may be made based on a value represented by 1 bit (0 or 1), may be made based on a true or false value (boolean: true or false), or may be made based on comparison with a numerical value (for example, comparison with a predetermined value).

Regardless of the fact that software is referred to as software, firmware, middleware, a microcode, a hardware description language, or another name, the software is broadly interpreted to include an instruction, an instruction set, a code, a code segment, a program code, a program, a sub-program, a software module, an application, a software application, a software package, a routine, a subroutine, an object, an executable file, an execution thread, a procedure, a function, or the like.

Software, an instruction, information, or the like may be transmitted or received via a transmission medium. For example, when software is transmitted from a website, a server, or another remote source using at least one of a wired technology (for example, a coaxial cable, an optical cable, a twisted pair, and a digital subscriber line (DSL)) and a wireless technology (for example, an infrared ray, and microwaves), at least one of the wired technology and the wireless technology is included in the definition of a transmission medium.

Information, a signal, and the like described in the disclosure may be represented by using any of various technologies. For example, data, an instruction, a command, information, a signal, a bit, a symbol, a chip, and the like that can be mentioned throughout the description above may be represented by a voltage, a current, an electromagnetic wave, a magnetic field or a magnetic particle, an optical field or a photon, or any combination thereof.

The terms described in the disclosure and terms necessary to understand the disclosure may be replaced with terms that have same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the disclosure are interchangeably used.

Information, a parameter, and the like described in the disclosure may be represented by using an absolute value, a relative value from a predetermined value, or another corresponding information. For example, a radio resource may be indicated by an index.

Names used for parameters described above are not limited in any respect. Further, a numerical expression or the like in which the parameters are used can be different from the numerical expression disclosed explicitly in the disclosure. Since various channels (for example, a PUCCH and a PDCCH) and information elements can be identified by any suitable names, various names allocated to the various channels and the information elements are not limited in any respect.

In the disclosure, the terms "base station (BS)", "wireless base station", "base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be interchangeably used. A base station may be referred to as a macro cell, a small cell, a femtocell, a picocell, or the like.

A base station can accommodate one or more (for example, three) cells. When a base station accommodates a plurality of cells, an entire coverage area of the base station can be divided into a plurality of small areas, and in each small area, a communication service can be provided through a base station subsystem (for example, a small indoor base station remote radio head (RRH)). The term "cell" or "sector" refers to a part or whole of the coverage area in which at least one of the base station and the base station subsystem provides a communication service.

In the disclosure, the terms "mobile station (MS)", "user terminal", "user equipment (UE)", and "terminal" can be interchangeably used.

In some cases, a mobile station is referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or any other suitable term by those skilled in the art.

At least one of a base station and a mobile station may be referred to as a transmission device, a receiving device, a communication device, and the like. At least one of a base station and a mobile station may be a device installed in a mobile object or a mobile object itself. The mobile object may be a vehicle (for example, a car and an airplane), may be an unmanned mobile object (for example, a drone and a self-driving car), and may be a robot (manned or unmanned). At least one of a base station and a mobile station includes a device that does not necessarily move at a communication operation. For example, at least one of a base station and a mobile station may be an Internet of Things (IoT) device such as a sensor.

The base station in the disclosure may be referred to as a user terminal. For example, each aspect/embodiment described in the disclosure may be applied to a configuration in which communication between a base station and a user terminal is replaced with communication between a plurality of terminal 20 (which may be referred to as Device-to-Device (D2D) and Vehicle-to-Everything (V2X), for example). In this case, the terminal 20 may include a function included in the base station 10 described above. Words "uplink" and "downlink" may be referred to as words for terminal-to-terminal communication (for example, "side"). For example, an uplink channel, a downlink channel, and the like may be referred to as a side channel.

Similarly, the user terminal in the disclosure may be referred to as a base station. In this case, the base station may include a function included in the user terminal described above.

The terms "determining" and "deciding" used in the disclosure may include various operations. The terms "determining" and "deciding" can include, for example, "determination" and "decision" for judging, calculating, computing, processing, deriving, investigating, looking-up (search and inquiry) (for example, looking-up in a table, a database, or another data structure), and ascertaining operations. In addition, the terms "determining" and "deciding" can include "determination" and "decision" for receiving (for example, receiving information), transmitting (for example, transmitting information), input, output, and accessing (for example, accessing data in a memory) operations. The terms "determining" and "deciding" can include "determination" and "decision" for resolving, selecting, choosing, establishing, and comparing operations. That is, the terms "determining" and "deciding" can include "determination" and "decision" for any operation. In addition, the term "determination" (or "deciding") may be referred to as, for example, "assuming", "expecting", and "considering".

The terms "connected" and "coupled", or all variations thereof indicate any direct or indirect connection or coupling between two or more elements, and can include existence of one or more intermediate elements between two mutually "connected" or "coupled" elements. The coupling or connection between elements may be physical, logical or in combinations thereof. The term "connection" may be referred to as "access" for example. When "connected" or "coupled" is used in the disclosure, it can be considered that two elements are mutually "connected" or "coupled", for example, with use of one or more electric wires, cables, print electric connections, or any combination thereof, and as several non-limiting and non-comprehensive examples, with use of electromagnetic energy or the like having a wave-length of a radio frequency domain, a microwave domain, and an optical (both visible and invisible) domain.

A reference signal can be omitted as a RS and may be referred to as a pilot depending on an applied standard.

The description "based on" used in the disclosure does not indicate "only based on" unless otherwise described. In other words, the description "based on" indicates both "only based on" and "at least based on".

Any reference to elements with use of terms "first," "second," and the like used in the disclosure does not limit the amount or the order of the elements in general. These terms can be used in the disclosure as a convenient method to distinguish two or more elements from each other. Accordingly, reference to first and second elements does not indicate that only two elements are used or the first element has to be prior to the second element in some ways.

The term "means" in a configuration of each device described above may be replaced with "unit", "circuit", "device" or the like.

When the terms "include" and "including" and the modifications thereof are used in the disclosure, these terms are intended to be inclusive, similarly as the term "comprising". In addition, the term "or" used in the disclosure is intended not to be an exclusive OR.

A radio frame may be formed by one or more frames in the time domain. Each of one or more frames in the time domain may be also referred to as a "subframe". Further, the subframe may be formed by one or more slots in the time domain. The subframe may be a fixed time length (for example, 1 ms) that is independent of a numerology.

The numerology may be a communication parameter which is applied to at least one of transmission and reception of a signal or a channel. A numerology may indicate, for example, at least one of a subcarrier spacing, a bandwidth, a symbol length, a cyclic prefix length, a transmission time interval, the number of symbols per a TTI, a radio frame configuration, a specific filtering process performed by a transceiver in the frequency domain, a specific windowing process performed by a transceiver in the time domain.

A slot may be formed by one or more symbols (orthogonal frequency division multiplexing (OFDM) symbols, a single carrier frequency division multiple access (SC-FDMA) symbols, or the like) in the time domain. A slot may be a time unit based on a numerology.

A slot may include a plurality of mini slots. Each mini slot may be formed by one or more symbols in the time domain. A mini slot may be referred to as a sub-slot. A mini slot may be formed by a smaller number of symbols than a slot. A PDSCH (or PUSCH) transmitted in a time unit that is larger than a mini slot may be referred to as a PDSCH (or PUSCH) mapping type A. A PDSCH (or PUSCH) transmitted by using a mini slot may be referred to as a PDSCH (or PUSCH) mapping type B.

Each of the radio frame, the subframe, the slot, and the symbol represents a time unit in which a signal is transmitted. For the radio frame, the subframe, the slot, the mini slot, and the symbol, different corresponding names may be used.

For example, one subframe may be referred to as a transmission time interval (TTI), a plurality of consecutive subframes may be referred to as a TTI, and one slot or one mini slot may be referred to as a TTI. Thus, at least one of a subframe and a TTI may be a subframe of the existing LTE (1 ms), may be a shorter duration than 1 ms (for example, 1 to 13 symbols, or may be a longer duration than 1 ms. A unit representing a TTI may be called "slot" or "mini slot", for example, instead of "subframe".

A TTI indicates, for example, a minimum time unit of scheduling in radio communication. In an LTE system, for example, a base station performs scheduling per a TTI to allocate a radio resource (a frequency bandwidth, transmission power, or the like which can be used by each terminal 20) to each terminal 20. The definition of a TTI is not limited to this.

A TTI may be a transmission time unit of a channel coding data packet (a transport block), a code block, a code word, and the like, and may be a processing unit of scheduling, link adaptation, and the like. When a TTI is given, a time section (for example, the number of symbols) to which a transport block, a code block, a code word, or the like is actually mapped, may be shorter than the TTI.

When one slot or one mini slot is called a TTI, one or more TTIs (that is, one or more slots or mini slots) may be a minimum time unit of scheduling. The number of slots (or mini slots) included in the minimum time unit of scheduling may be controlled.

A TTI with 1 ms time length may be referred to as a normal TTI (a TTI of LTE Rel. 8-12), a normal TTI, a long TTI, a normal subframe, a long subframe, a slot, and the like. A TTI shorter than a normal TTI may be referred to as a shortened TTI, a short TTI, a partial TTI (or a fractional TTI), a shortened subframe, a short subframe, a mini slot, a sub-slot, a slot, and the like.

A long TTI (for example, a normal TTI or a subframe) may be replaced with a TTI having more than 1 ms time length, and a short TTI (for example, a shortened TTI) may be replaced with a TTI having TTI length that is shorter than a long TTI and longer or equal to 1 ms.

A resource block (RB) is a resource allocation unit in the time domain and the frequency domain and may include one or more consecutive subcarriers in the frequency domain. The number of subcarriers included in an RB may be the same regardless of a numerology, and may be 12 for example. The number of subcarriers included in an RB may be determined based on a numerology.

The time domain of the resource block may include one or more symbols, and may be a length of one slot, one mini slot, one subframe, or one TTI. Each of one TTI, one subframe and the like may be formed by one or more resource blocks.

One or more RBs may be referred to as a physical RB (PRB), a sub-carrier group (SCG), a resource element group (REG), a PRB pair, an RB pair, and the like.

A resource block may be formed by one or more resource elements. For example, 1 RE may be a radio resource area for one sub-carrier and one symbol.

A bandwidth part (which may be referred to as a part bandwidth, for example) may represent a subset of a consecutive common resource blocks (common RB) for a numerology in a carrier. A common RB may be determined by an index of an RB based on a common reference point of the carrier. A PRB may be defined by a BWP and may be numbered in the BWP.

A BWP may include a UL BWP and DL BWP. One or more BWPs may be configured in one carrier to UE.

At least one configured BWP may be active, and UE does not have to assume transmission and reception of a predetermined signal/channel outside of the active BWP. Terms "cell" and "carrier" in the disclosure may be referred to as "BWP".

The structures of the radio frame, the sub frame, the slot, the mini slot, the symbol, and the like described above are merely examples. For example, the number of subframes included in the radio frame, the number of slots per a subframe or a radio frame, the number of mini slots included in the slot, the number of symbols and RBs included in the slot or the mini slot, the number of subcarriers included in the RB, and also the number of symbols in the TTI, a symbol length, and a cyclic prefix (CP) length can be modified in any manner.

In the disclosure, for example, when an article, such as "a", "an", or "the", in English is added by translation, noun followed by the article may include the meaning of the plural in the disclosure.

In the disclosure, the term "A and B are different" may indicate "A and B are different from each other". The term may also indicate "each of A and B is different from C". The terms "separated", "combined", and the like may be similarly interpreted.

The aspects/embodiments described in the disclosure may be individually used, may be combined, or may be switched during execution. In addition, transmission of predetermined information (for example, transmission of "being X") is not limited to being performed explicitly, but may be performed implicitly (for example, the transmission of the predetermined information is not performed).

In the disclosure, the transmission unit 210 and the reception unit 220 is an example of a communication unit. The wakeup is an example of activation.

The disclosure has been described in detail above. It will be apparent to those skilled in the art that the disclosure is not limited to the embodiments described in the disclosure. Various modifications and changes can be made, without departing from the scope and spirit of the disclosure described in the claims. Therefore, the description in the disclosure is made for illustrative description and does not have any restrictive meaning to the disclosure.

DESCRIPTION OF REFERENCE SIGNS

10 base station
110 transmission unit
120 reception unit
130 configuration unit
140 control unit
20 terminal
210 transmission unit
220 reception unit
230 configuration unit
240 control unit
1001 processor
1002 storage device
1003 auxiliary storage device
1004 communication device
1005 input device
1006 output device

The invention claimed is:

1. A base station comprising:
a transceiver configured to perform communication with a plurality of terminals through cells; and
a processor configured to perform measurement of a number of active terminals in layer 2 measurement for each cell,
wherein the processor measures the number of the active terminals for each cell and for each synchronization signal/physical broadcast channel (SS/PBCH) block (SSB) index.

2. The base station as claimed in claim 1,
wherein the processor measures the number of the active terminals for each cell and for each beam.

3. The base station as claimed in claim 2,
wherein the processor performs control related to load, based on the number of the active terminals.

4. The base station as claimed in claim 1,
wherein the processor performs control related to load, based on the number of the active terminals.

5. A measurement method performed by a base station, the measurement method comprising:
performing communication with a plurality of terminals through cells; and
performing measurement of a number of active terminals in layer 2 measurement for each cell,
wherein the base station measures the number of the active terminals for each cell and for each synchronization signal/physical broadcast channel (SS/PBCH) block (SSB) index.

6. A communication system comprising: a base station; and a terminal, wherein
the base station includes:
a first transceiver configured to perform communication with a plurality of terminals through cells; and
a processor configured to perform measurement of a number of active terminals in layer 2 measurement for each cell, and
the terminal includes:
a second transceiver configured to perform communication with the base station through the cells,
wherein the processor measures the number of the active terminals for each cell and for each synchronization signal/physical broadcast channel (SS/PBCH) block (SSB) index.

* * * * *